United States Patent
Copelli et al.

(10) Patent No.: US 11,793,350 B2
(45) Date of Patent: Oct. 24, 2023

(54) DEVICE AND METHOD FOR EMULSIFYING LIQUID OR SOLID PRODUCTS, IN PARTICULAR FOOD PRODUCTS SUCH AS MILK OR ICE CREAM

(71) Applicant: FLUID-O-TECH S.R.L., Corsico (IT)

(72) Inventors: Stefano Copelli, Cusano Milanino (IT); Diego Andreis, Milan (IT)

(73) Assignee: FLUID-O-TECH S.R.L., Corsico (IT)

( * ) Notice: Subject to any disclaimer, the term of this patent is extended or adjusted under 35 U.S.C. 154(b) by 732 days.

(21) Appl. No.: 16/414,235

(22) Filed: May 16, 2019

(65) Prior Publication Data
US 2020/0359833 A1    Nov. 19, 2020

(51) Int. Cl.
A47J 31/44 (2006.01)
A23C 9/152 (2006.01)
A23G 9/46 (2006.01)

(52) U.S. Cl.
CPC ......... *A47J 31/4485* (2013.01); *A23C 9/1524* (2013.01); *A47J 31/4496* (2013.01); *A23C 2210/30* (2013.01); *A23G 9/46* (2013.01)

(58) Field of Classification Search
CPC . A47J 31/4485; A47J 31/4496; A23C 9/1524; A23C 2210/30; A23G 9/46;
(Continued)

(56) References Cited

U.S. PATENT DOCUMENTS 5,385,464 A * 1/1995 Anderson .............. A23G 9/281
425/118

5,868,065 A * 2/1999 Haggerty ................ A23G 9/16
366/144

(Continued)

FOREIGN PATENT DOCUMENTS

DE         3726836 A1 *  2/1989
DE         4200031 C1    6/1993
(Continued)

OTHER PUBLICATIONS

Machine translation of EP 0659351 performed on Feb. 9, 2022.*
Machine tarnslation of DE 3726836 performed on Feb. 9, 2022.*

*Primary Examiner* — Tu B Hoang
*Assistant Examiner* — Alba T Rosario-Aponte
(74) *Attorney, Agent, or Firm* — CANTOR COLBURN LLP

(57) ABSTRACT

A device for emulsifying liquid or solid products, in particular food products such as milk or ice cream, including a pump having at least one suction duct adapted for sucking a product to be emulsified and an emulsifying gas, and a delivery duct adapted for dispensing an emulsion obtained starting from the product to be emulsified and from the emulsifying gas, where the pump has a double worm screw arranged between the suction duct and the delivery duct, the double worm screw being adapted for emulsifying the product and the gas to obtain the emulsion and to push the product, the gas and/or the emulsion with a flow substantially parallel to the axis of the screws of the double worm screw from the suction duct to the delivery duct. Moreover, the device comprises cooling means associated with the pump in an area comprised between the suction duct and the delivery duct and adapted for cooling the product, the gas and/or the emulsion present in the area of the pump comprised between the suction duct and the delivery duct.

14 Claims, 8 Drawing Sheets

(58) Field of Classification Search
CPC .......... A23G 9/163; A23G 9/281; A23G 9/12; A23G 9/00
USPC .................... 99/323, 455, 453, 517; 426/565
See application file for complete search history.

(56) References Cited

U.S. PATENT DOCUMENTS

| | | | |
|---|---|---|---|
| 5,916,248 A * | 6/1999 | Bravo | A23G 9/305 99/453 |
| 5,919,510 A * | 7/1999 | Fayard | A23G 9/285 62/343 |
| RE36,690 E | 5/2000 | McGraw et al. | |
| 6,145,701 A * | 11/2000 | Van Der Merwe | A23G 9/283 222/146.6 |
| 6,613,374 B1 | 9/2003 | Fayard | |
| 6,863,916 B2 * | 3/2005 | Henriksen | A23G 9/224 426/524 |
| 2010/0139500 A1 * | 6/2010 | Bravo | A23G 9/305 99/455 |

FOREIGN PATENT DOCUMENTS

| | | |
|---|---|---|
| EP | 0659351 A1 * | 6/1995 |
| EP | 0659351 A1 | 6/1995 |
| EP | 0713650 A1 | 5/1996 |
| EP | 0808575 A1 | 11/1997 |
| EP | 3305145 A1 | 4/2018 |
| GB | 808491 | 4/1955 |
| GB | 808491 A * | 2/1959 |
| WO | 9739637 A1 | 10/1997 |
| WO | 9810664 A1 | 3/1998 |

* cited by examiner

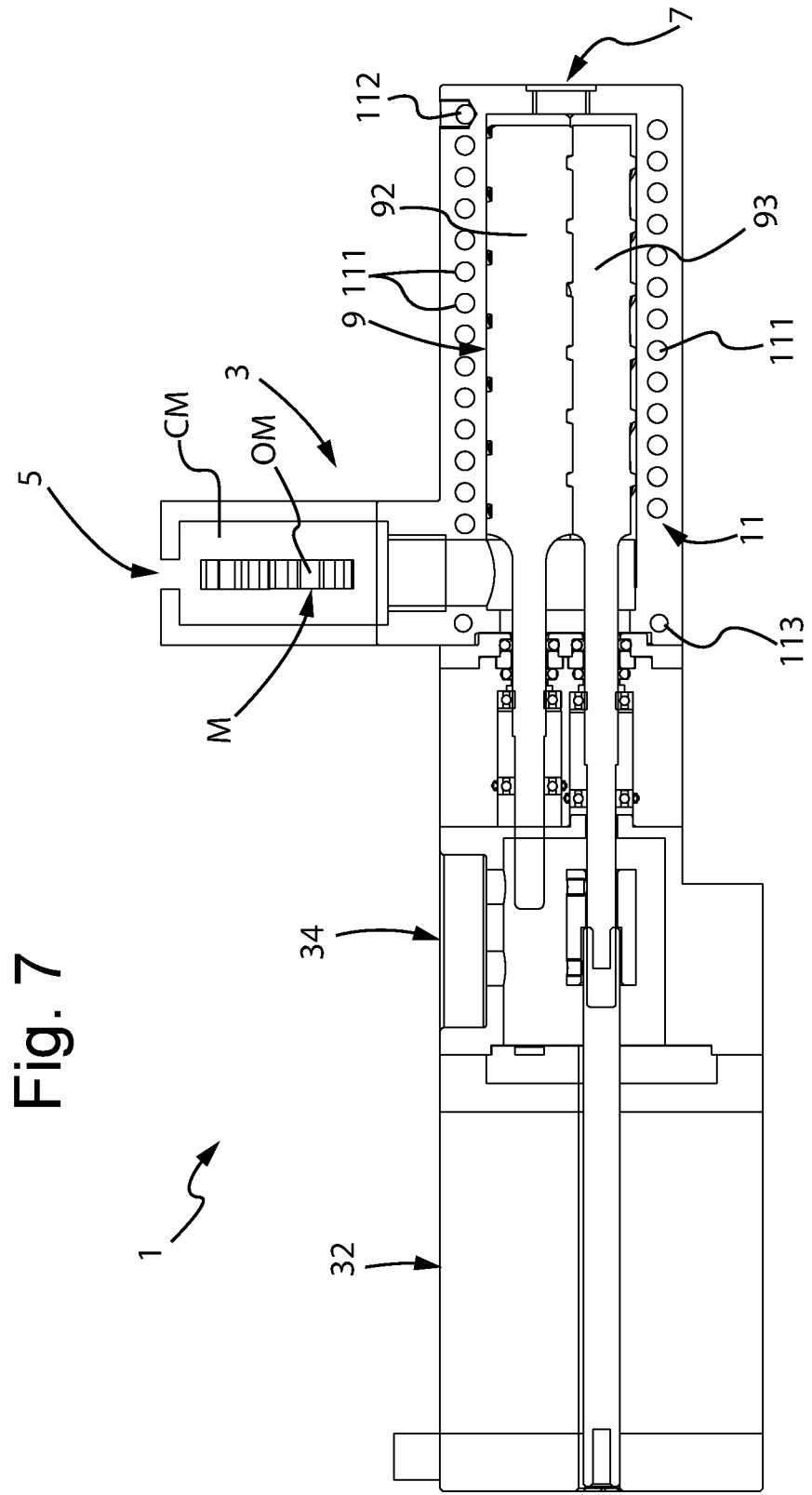

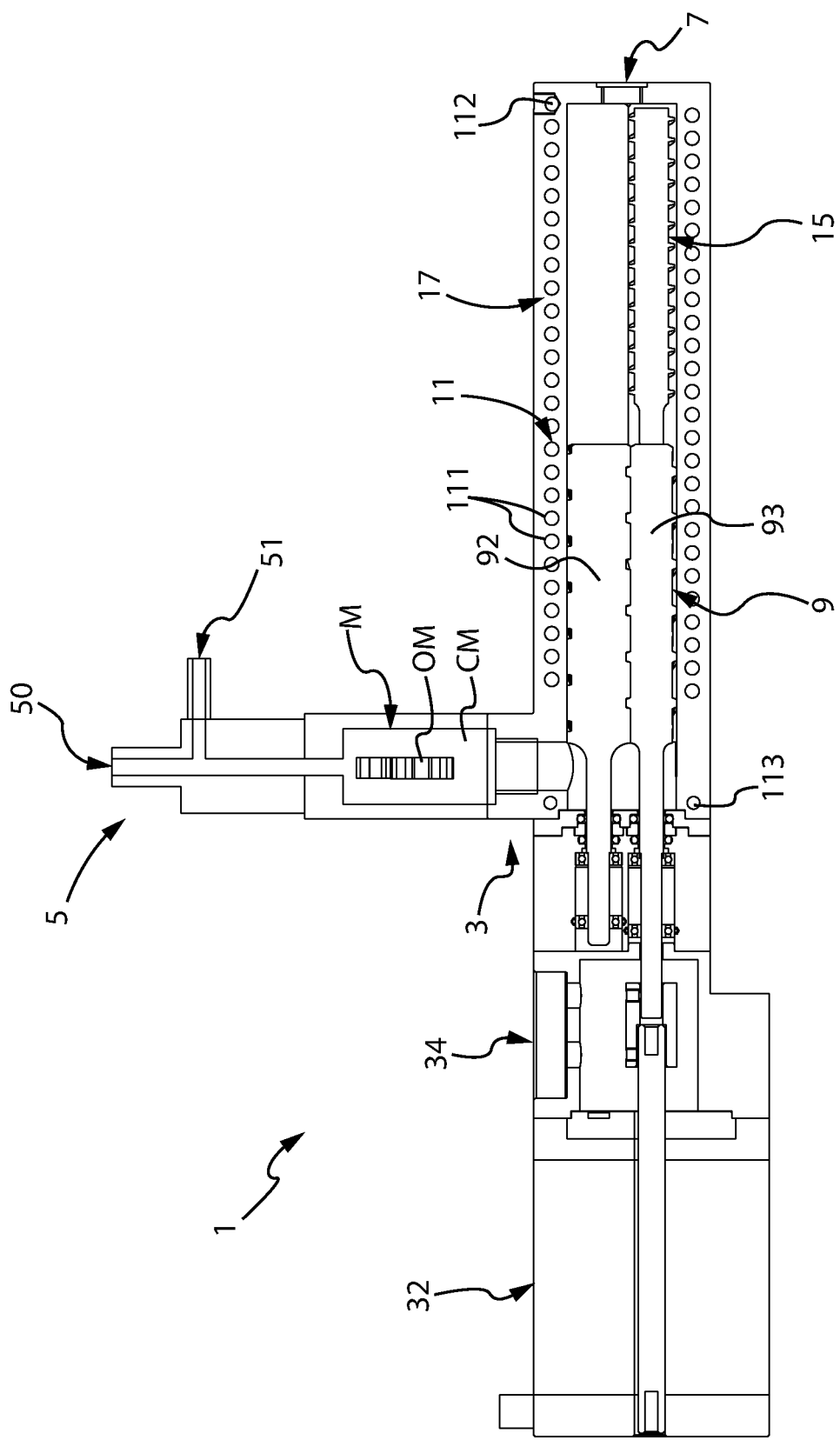

DEVICE AND METHOD FOR EMULSIFYING LIQUID OR SOLID PRODUCTS, IN PARTICULAR FOOD PRODUCTS SUCH AS MILK OR ICE CREAM

TECHNICAL FIELD

The present disclosure relates to a device and a method for emulsifying liquid or solid products, in particular food products such as milk or ice cream, but also cream, coffee.

BACKGROUND

In the catering sector, milk and ice cream, as well as other refrigerated foods, are strategic foods that are often processed to obtain emulsions of the same.

For example, ice cream can be served whipped and emulsified to make a two-phase product consisting of a creamy part, a gaseous part and/or a liquid part between them which cannot be immediately separated. An example of ice cream processing in which whipping with emulsion is required is the preparation of so-called "soft ice cream". Similarly, milk is also often processed through emulsion and cooling for the preparation of so-called "milk shakes".

Often the ice cream whipping operation is performed by hand directly by the ice cream maker, through the use of tools or simple machines, but involves considerable difficulties that often result in the preparation of a product with an unsatisfactory consistency.

In an attempt to overcome this drawback, machines capable of automating the whipping process have been developed, which use gear pumps or eccentric screw pumps capable of sucking a quantity of product to be emulsified, together with air, in order to obtain at the outlet an emulsion which can subsequently be cooled to have a cold emulsified product.

However one of the major drawbacks affecting this type of machines concerns the excessive quantities of product that are discarded. In particular, these machines contain large quantities of product that stagnate in the dead volumes present in the components of the machines themselves, for example in the pump or in the cooling circuits, and in the connecting parts between the different components.

Another drawback of the known type of machines, linked to the presence of the aforementioned dead volumes of stagnated product, concerns the difficulty of cleaning such machines and consequently the risks that the hygiene of the machine can be compromised.

Yet another drawback relates to the fact that the known-type machines often do not guarantee a satisfactory emulsion and texturing of the product.

Another drawback of the known type of machines lies in their technical complexity and overall dimensions, which often limit their application to purely industrial sectors.

BRIEF SUMMARY

The task of the present disclosure is to provide a device and a method for emulsifying liquid or solid products, in particular food products such as milk or ice cream, which overcome the drawbacks and limitations of the prior art, allowing the production of cold emulsions of food products in an extremely simple, low-cost and particularly flexible and functional way.

The disclosure is intended to be able to emulsify and cool food products with a single compact device, which is simple to use and maintain.

The disclosure ensures a high quality standard of the emulsified food product.

The disclosure provides a device for emulsifying liquid or solid products which guarantees a high degree of hygiene, and which can be easily and efficiently washed and cleaned.

The disclosure provides a device and a method for emulsifying food products which allows easily varying the processing parameters of the food product, such as the quantity of product processed, and/or the density and temperature of the emulsified product obtained.

The disclosure also concerns making a device that is capable of providing the broadest guarantees of reliability and security when used.

BRIEF DESCRIPTION OF THE DRAWINGS

Additional features and advantages will become more apparent from the description of a preferred, but non-exclusive, embodiment of a device for emulsifying liquid or solid products, illustrated by way of non-limiting example with the aid of the appended drawings, in which:

FIG. 7 is a longitudinal sectional view of a second variant of the device for emulsifying liquid or solid products, according to the disclosure;

FIG. 8 is a longitudinal sectional view of a third variant of the device for emulsifying liquid or solid products, according to the disclosure.

DETAILED DESCRIPTION

Figure 1:
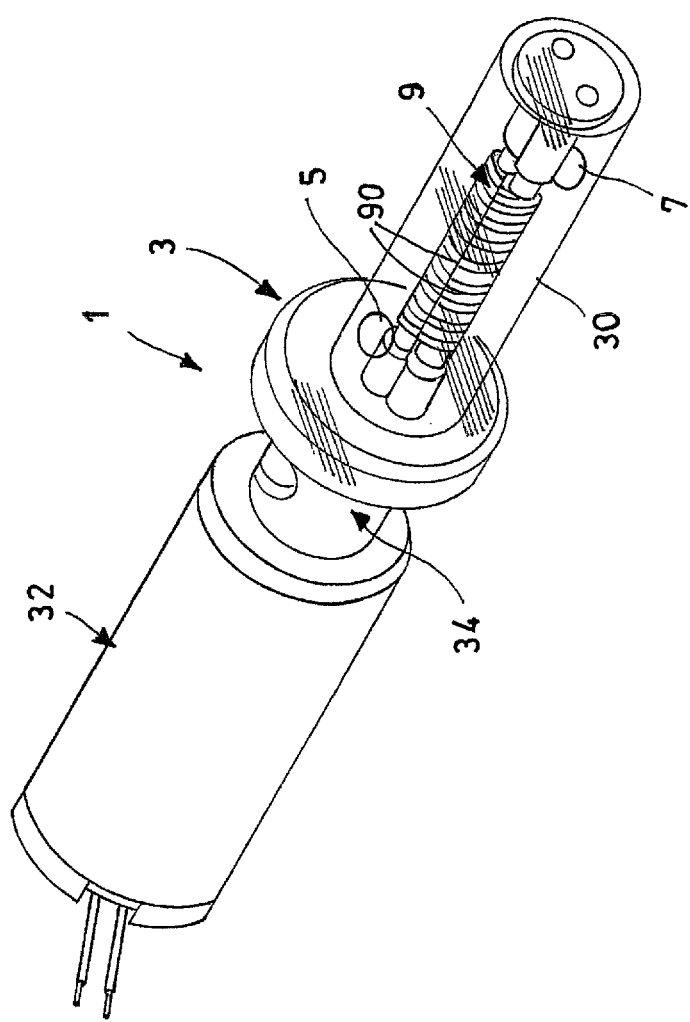
FIG. 1 is a perspective view, partially transparent, of an embodiment of a device for emulsifying liquid or solid products, according to the disclosure, also including its motorisation.

With reference to the aforementioned figures, the device for emulsifying liquid or solid products, in particular food products such as milk or ice cream, generally indicated with the reference number 1, comprises a pump 3 comprising at least one suction duct 5 adapted for sucking a product to be emulsified and an emulsifying gas, and a delivery duct 7 adapted for dispensing an emulsion obtained starting from said product to be emulsified and from said emulsifying gas.

According to the disclosure, the pump 3 comprises a double worm screw 9 arranged between the suction duct 5 and the delivery duct 7. The double worm screw 9 is adapted for emulsifying the product and the gas to obtain the emulsion and to push the product, gas and/or emulsion with a flow substantially parallel to the axis of the screws 90 of the double worm screw 9, from the suction duct 5 to the delivery duct 7. The device 1 further comprises, according to the disclosure, cooling means 11 associated with the pump 3 in an area comprised between the suction duct 5 and the delivery duct 7 and adapted for cooling the product, gas and/or emulsion present in the area of the pump 3 comprised between the suction duct 5 and the delivery duct 7.

The device 1 is advantageously adapted for processing liquid food products such as milk, or solids, or semi-solids, such as ice cream.

The product to be emulsified and the emulsifying gas, which can simply be air, are sucked from the inlet of the suction duct 5; the emulsion of this product with this gas is dispensed from the outlet of the delivery duct 7. There is a mixture of product, gas and emulsion in different proportions in the path that passes from the suction duct 5 to the delivery duct 7.

Advantageously, the cooling means 11 are adapted for lowering the temperature of the product entering the suction duct 5 so that the temperature of the emulsion exiting the delivery duct 7 has a substantially lower temperature than the temperature of the incoming product.

Figure 2:
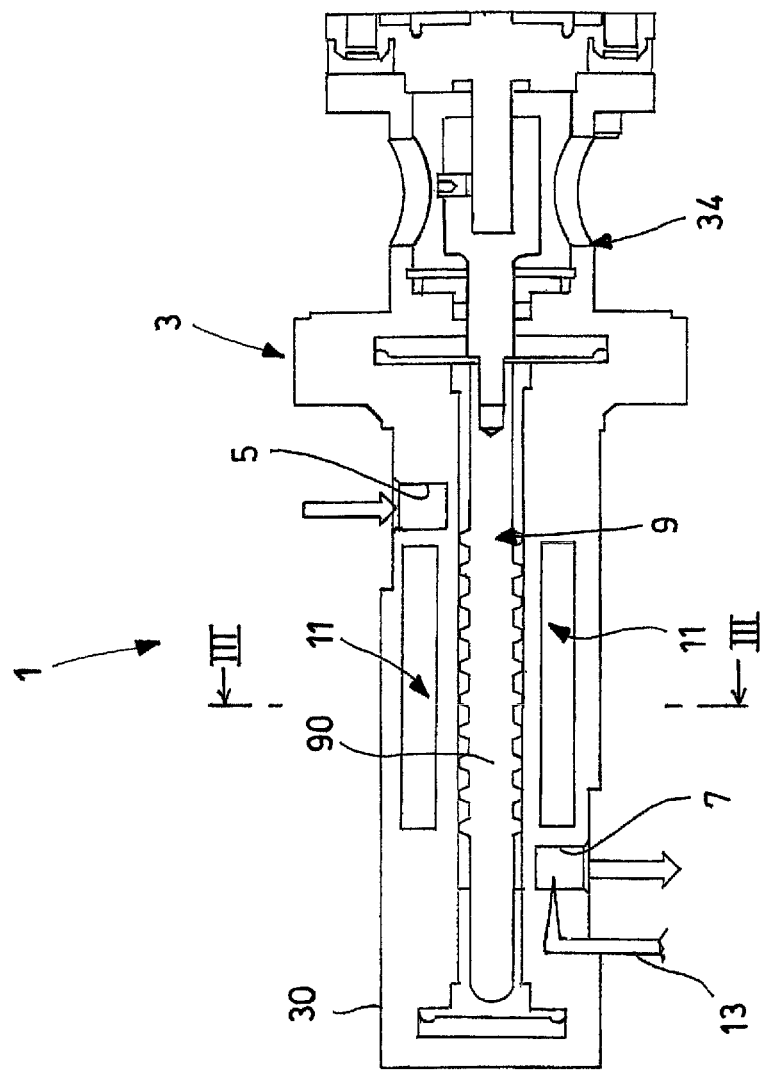
FIG. 2 is a longitudinal sectional view of part of the device of FIG. 1, according to the disclosure.
Figure 3:
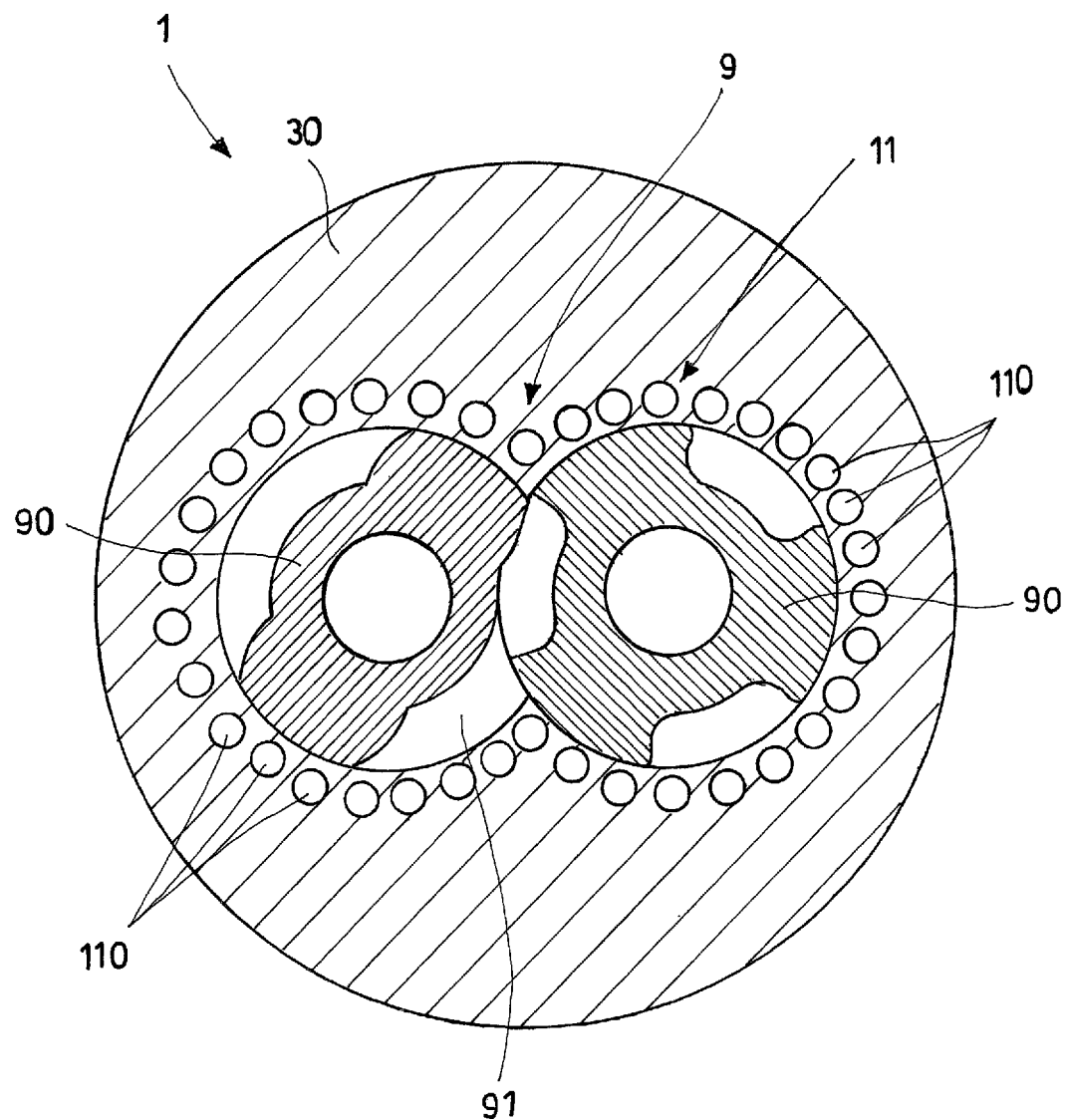
FIG. 3 is a sectional view of the device of FIG. 2, performed according to the axis III-III.
Figure 4:
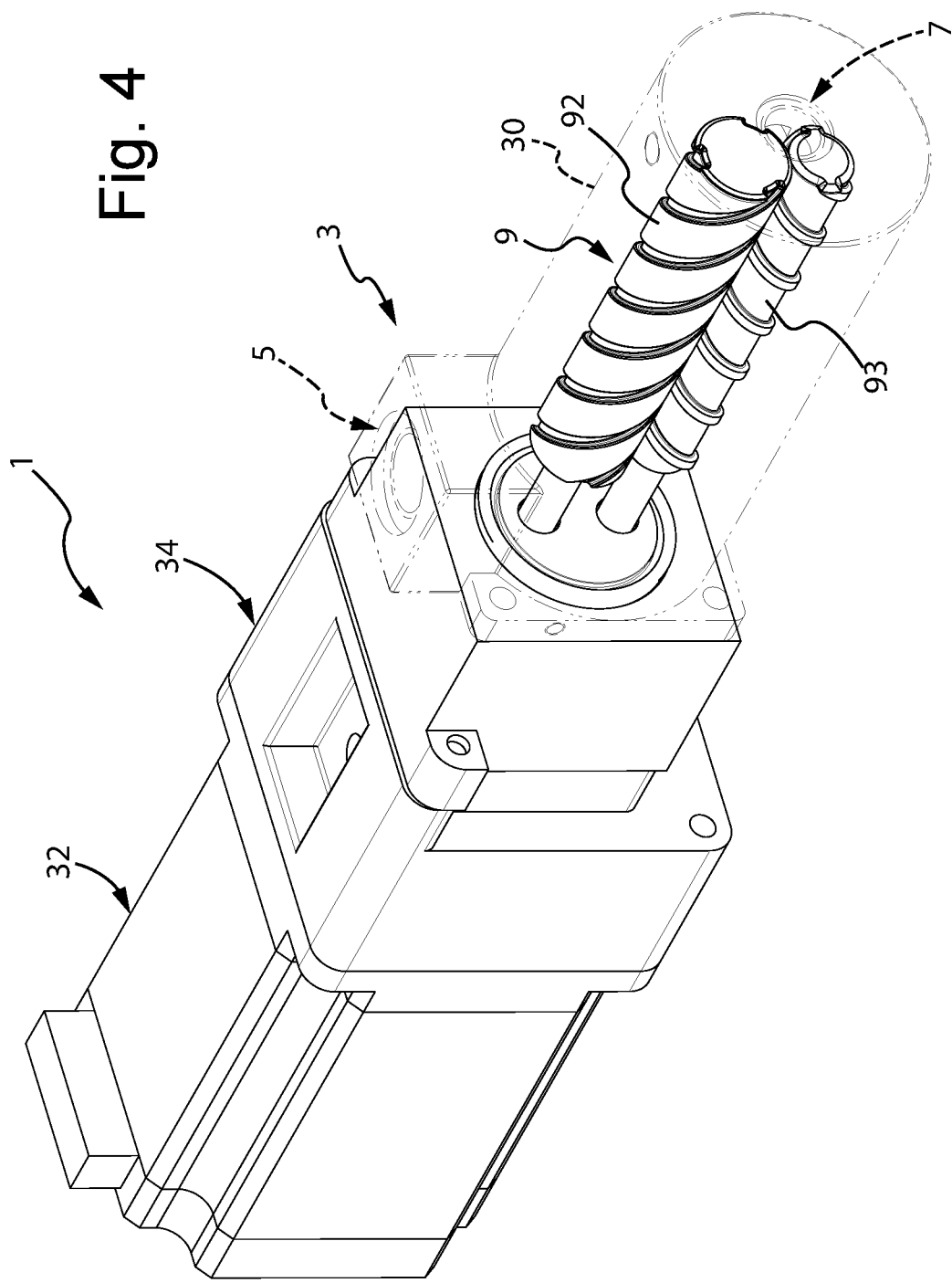
FIG. 4 is a perspective view, partially transparent, of a first variant of the device of FIG. 1, according to the disclosure, also including its motorisation.

Advantageously, as shown in FIGS. 1 to 3, the double worm screw 9 comprises a pair of worm screws 90 with helical profile and antagonist coils set in rotation along mutually parallel axes. During the rotation of the screws 90, the antagonist coils of the two screws 90 define variable-volume chambers 91 through which the product, gas and/or emulsion are advanced, in an overall direction parallel to the axis of rotation of the worm screws 90.

In the variants of the device 1 illustrated in FIGS. 4 to 8, the double worm screw 9 comprises a pair of worm screws 92 and 93 with helical profile and antagonist coils set in rotation along mutually parallel axes, where these two worm screws 92 and 93 have different diameters and profiles from each other. In particular, the driving screw 93, i.e. the screw directly driven by the motor 32, has a double-start profile and a smaller diameter, while the driven screw 92 has a three-start profile and a larger diameter.

Advantageously, the profiles of the screws 90, 91, 92 are configured to keep the product as close as possible to the cooling means 11, so as to facilitate the heat exchange between the product and the cooling means 11.

Advantageously, the double worm screw 9 can be made with other equivalent construction methods, with generic rotating bodies provided with conjugated profiles, or it can have a number of worm screws connected to each other which is greater than two.

The pump 3 with double worm screw 9 has proven to be particularly effective in obtaining a satisfactory quality of the emulsion obtained, particularly with regard to emulsified ice cream.

In fact the pump 3 is able to suck the correct quantity of product and the relative quantity of air from the suction duct 5. Subsequently the progressive movement of the product and air mixture through the worm screws 90 brings a high degree of homogenisation and texturing to the final emulsified product.

Advantageously, the double worm screw 9 is also able to counter-rotate, for example to perform a purging step.

Advantageously, moreover, the double worm screw 9 is able to rotate even when dry or with fluids of different nature.

Advantageously, the device 1 can comprise a pair of separate suction ducts adapted for respectively sucking the product to be emulsified and the emulsifying gas, such as air. In this way, junction points of the Y or T type are avoided in the part of the suction duct 5 interposed between the suction mouth and the initial portion of the double worm screw 9.

Alternatively, as illustrated for example with reference to the variant of the device 1 shown in FIG. 8, a single suction duct 5 can be provided comprising a junction of the Y or T type in the end part of the suction duct 5, close to the initial portion of the double worm screw 9, to allow both the suction of the product, for example through an inlet mouth for the product 50, and of air, for example through a separate inlet for air 51.

Advantageously, the suction duct 5 can comprise mixing means configured to mix and/or emulsify and/or whip, inside the suction duct 5 itself, the product to be emulsified.

Advantageously, the mixing means can comprise mixing screws, preferably comprising further mixing elements which may or may not mutually rotate with the rotation axis of the mixing screws themselves.

Advantageously, this mixing means has extended geometries and surfaces adapted for starting, already in the suction duct 5, the emulsion process of the product to be emulsified, and therefore adapted for accelerating and facilitating the subsequent emulsion of the product by the double worm screw 9.

Advantageously, the mixing means can accelerate and facilitate the process of mixing and absorbing the gas with the product to be emulsified, as well as the creaming process of the product to be emulsified, if it is composed of components that need such processing, such as sugars and fats.

In the variants of the device 1 shown in FIGS. 7 and 8, the mixing means present in the suction duct 5 are indicated with M and comprise a mixing chamber CM and a mixing member OM, preferably electrically operated by means of a motor.

Advantageously, as shown in the section of FIG. 3, the cooling means, generically indicated with the reference number 11, can comprise a plurality of cooling channels 110, 111 inside which a cooling liquid flows.

Figure 6:
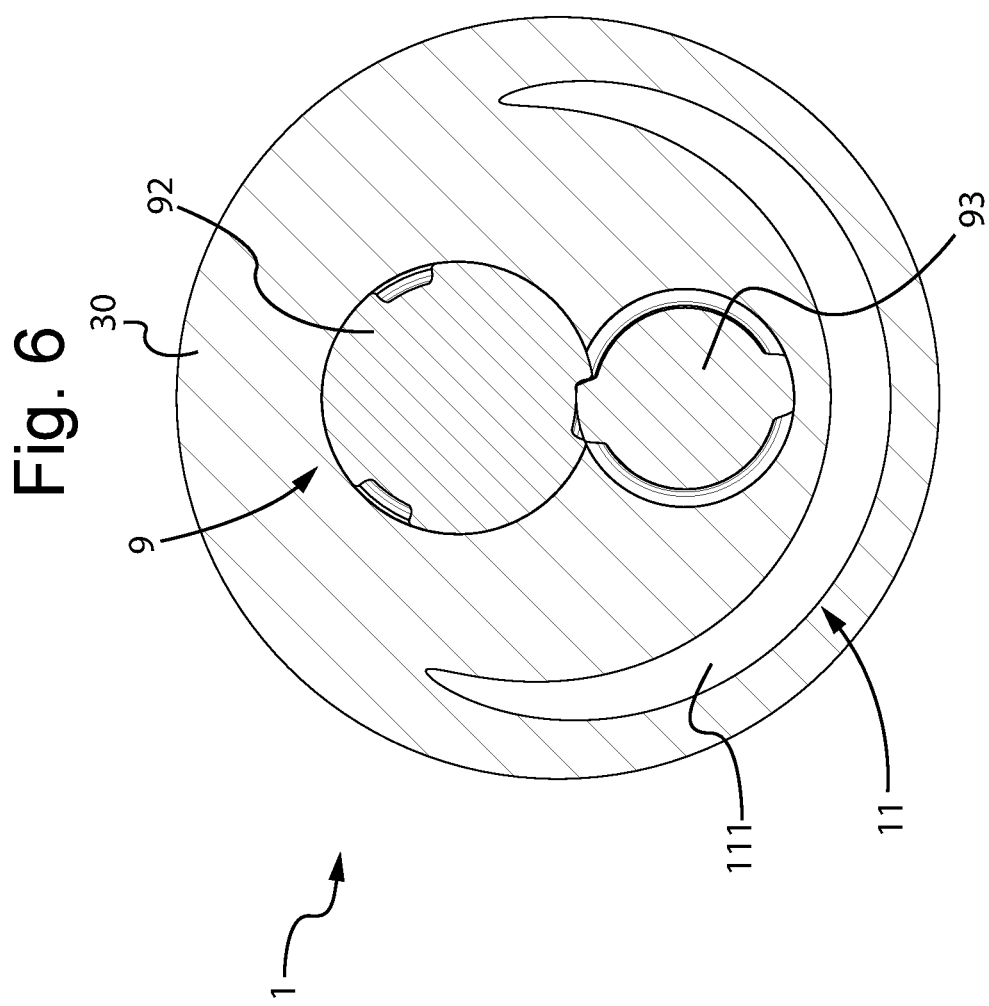
FIG. 6 is a sectional view of the device of FIG. 5, performed according to the axis VI-VI.

The cooling channels 110 can extend helically around the central axis of the double worm screw 9, as in the case of the section illustrated in FIG. 6. Alternatively, the cooling channels 111 can extend longitudinally and parallel to the central axis of the double worm screw 9, as in the case of the section illustrated in FIG. 3.

The cooling channels 110, 111 can be housed inside the casing 30 which holds the double worm screw 9 close to the variable-volume chambers 91 defined by the antagonist coils of the worm screws 90, as shown in FIG. 3, or close to the variable-volume chambers defined by the antagonist coils of the worm screws 92, 93, as illustrated in FIG. 6.

Advantageously, the longitudinally extending cooling channels 110 can be mutually connected to one another at their longitudinal ends, so as to define a cooling coil which envelops, in a longitudinal manner or with a helical trend, the variable-volume chamber 91 defined by the coils of the worm screws 90.

Advantageously, the cooling means 11 can operate through thermoelectric cooling, for example by exploiting the Peltier effect.

Advantageously, the cooling means 11 can operate through thermodynamic cooling, for example according to a Carnot cycle, or according to a Reverse Rankine cycle.

Advantageously, the cooling means 11 can exploit the heat absorbed by the phase passage of the cooling liquid.

Advantageously, the cooling means 11 can comprise magnetic refrigeration systems, for example operating through adiabatic demagnetisation techniques.

Preferably the cooling means 11 extend along substantially the entire longitudinal extension of the pump 3 between the suction duct 5 and the delivery duct 7. In this way the cooling means 11 are able to cool the product, gas and/or emulsion along the entire pathway among the double worm screw 9.

Advantageously, the circulation of the cooling fluid inside the cooling channels 110, 111 can be reversed if necessary. In particular, the circulation of the cooling fluid can be counter-current or in the same direction of movement as the product from the suction duct 5 to the delivery duct 7, depending on need.

Figure 5:
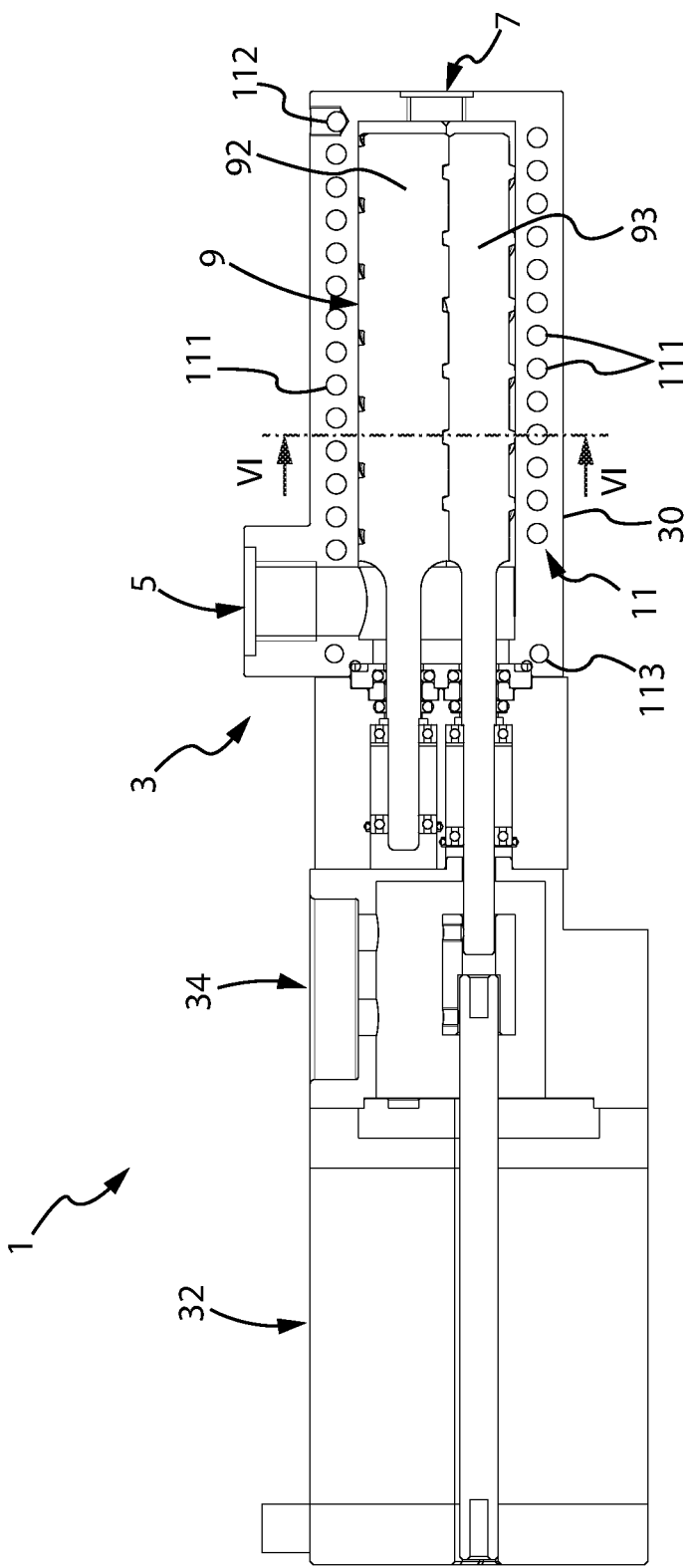
FIG. 5 is a longitudinal section view of the device of FIG. 4, according to the disclosure.

In FIG. 5 the inlet mouth of the cooling fluid inside the cooling channels 111 is indicated with 112 and the outlet mouth of the cooling fluid from the cooling channels 111 is indicated with 113.

During use of the device 1, the cooling fluid is fed through the inlet mouth 112 placed near the delivery duct 7, so as to ensure that the emulsified product exits at said delivery duct 7 with the desired cold temperature.

Vice versa, for example when the temperature of the device 1 must be raised in order to be able to clean it, a heating fluid is made to flow along the cooling channels 111 in the opposite direction, that is to say it is fed from the outlet mouth 113 placed near the suction duct 5 instead of the delivery duct 7 and taken from the inlet mouth 112.

The pump 3 advantageously comprises a casing 30 made of a heat-conducting material, such as preferably a metal.

The cooling means 11 can be associated with the casing 30, for example externally and circumferentially with respect thereto, or at least partially embedded within the casing 30.

Advantageously the casing 30 can be made of a heat-conducting material, associated with cooling means 11 comprising one or more materials which exploit the accumulation of sensible, thermochemical, latent heat, where said one or more materials is associated with, or at least partially embedded in, the casing 30.

The product, gas and/or emulsion which pass through the pump 3 are cooled by the effect of the heat conduction which occurs between this product, gas and/or emulsion and the cooling means 11, through the material in which the casing 30 of the pump 3 is made.

In a different embodiment of the disclosure, the double worm screw 9 is made of a heat-conducting material, such as preferably a metal.

In this case the cooling means 11 can be directly associated with the double worm screw 9. For example, these cooling means 11 can be in contact with an end portion of the double worm screw 9 and exploit the heat conduction that occurs along the double screw 9 itself.

Preferably the cooling means 11 are embedded within the body of the double worm screw 9.

Advantageously, the portions of the pump 3 not intended for heat exchange can be made of polymeric materials, for example of the plastic type.

Advantageously, the portions of the pump 3 intended for heat exchange can be made of both heat and electric-conducting materials, for example thanks to the exploitation of nanotechnologies such as nano carbon tubes, or even in ceramic material.

Advantageously, the device 1 comprises a temperature sensor 13 adapted for detecting the temperature of the emulsion exiting from the delivery duct 7. The temperature sensor 13 can advantageously be in direct contact with the emulsion exiting the delivery duct 7.

Advantageously, the pump 3 comprises a motor 32 adapted for actuating the double worm screw 9 by means of a transmission joint 34.

The device 1 advantageously comprises a control module configured to set a rotation speed of the motor 32, and therefore of the double worm screw 9 and/or to count the number of revolutions of the motor 32 and thus obtain the number of revolutions of the double worm screw 9.

Advantageously, the pump 3 has external dimensions substantially less than 100 millimetres in length and 80 millimetres in diameter.

If the device 1 also comprises the motor 32, the overall external dimensions of the device 1 are substantially less than 300 millimetres in length and 80 millimetres in diameter.

Advantageously, the device 1 can have a weight comprised in the range between 200 grams and 3 kilograms depending on whether the motor 32 is integrated or not in the device 1 itself.

The reduced dimensions of the device 1 and of the relative components, and in particular of the components intended to favour the heat exchange between the cooling means 11 and the product, gas and/or emulsion, such as the casing 30 of the pump 3, or the same double worm screw 9, minimise the overall thermal capacity of the system, and therefore make it possible to obtain consecutive deliveries of cooled or room temperature emulsions with extreme flexibility.

In this way in fact the device 1 can in very little time pass from very low operating temperatures, around −20° C. to higher temperatures, around 5° C. or 10° C., necessary for a so-called "clean in place" (CIP) cleaning of the device 1, which can be performed for example after each dispensing of a product, or even at significantly higher temperatures, around more than 70° C., necessary for deep cleaning including also sterilisation treatments of the device 1. Advantageously, thanks to the reduced thermal inertia of the device 1, and therefore the relative reduced quantity of cooling/heating liquid necessary to cool, keep cooled, or heat the device 1 itself, it is possible to have tanks of cooling or heating liquids available at desired temperatures, from which to take only the quantity of cooling or heating liquid required to operate the required function.

The low thermal inertia allows the use of low levels of power for the use of cooling and/or heating systems other than fluids, such as Peltier systems or electric heaters.

Also, by using constructive forms characterised by greater thermal inertia, the device 1 can use the thermal energy released or absorbed by exploiting, for example, singularly or coupled, materials for the accumulation of sensible heat, materials that exploit thermochemical accumulation, materials that exploit the latent heat.

Advantageously, as illustrated in the variant of the device shown in FIG. 8, the device 1 can also comprise a single worm screw 15 placed in series with the double worm screw 9 and further cooling means 17, so as to ensure, at the outlet of the device 1, a product dispensed at the desired temperature.

The additional cooling means 17 of the single worm screw 15 can be part of the same cooling circuit which also includes the cooling means 11 of the double worm screw 9. Alternatively, said further cooling means 17 can be connected to a different cooling circuit than that of the cooling means 11.

The present disclosure also relates to a method for emulsifying liquid or solid products, in particular food products such as milk or ice cream, comprising the following steps:
  sucking a product to be emulsified and an emulsifying gas from a suction duct 5 of a pump 3 comprising a double worm screw 9;
  emulsifying, through this double worm screw 9, the product to be emulsified and the emulsifying gas to obtain an emulsion;

pushing the product, gas and/or emulsion, by means of the double worm screw 9, from the suction duct 5 to the delivery duct 7 with a flow substantially parallel to the axis of the screws of the double worm screw 9;

cooling the product, gas and/or emulsion, by means of cooling means 11 associated with said pump 3 in an area comprised between the suction duct 5 and the delivery duct 7, to obtain a cold emulsion;

dispensing this cold emulsion from a delivery duct 7 of the pump 3.

Advantageously, the aforementioned method for emulsifying liquid or solid products is performed by a device for emulsifying liquid or solid products as described above.

The method advantageously comprises the step of detecting or obtaining the temperature of the cold emulsion exiting from the delivery duct 7 to adjust the activation of the cooling means 11 as a function of a desired temperature of the cold emulsion.

In particular, if the temperature sensor 13 is in direct contact with the emulsion exiting the delivery duct 7, the temperature of the emulsion is directly detected.

Advantageously, the method comprises the step of selecting the rotation speed of the double worm screw 9 to establish the contact time of the product, gas and/or emulsion with the cooling means 11 and therefore the amount of heat exchange between the cooling means 11 and the product, gas and/or emulsion, or to vary the quantity of gas sucked and therefore the consistency of the emulsion exiting the delivery duct 7.

Advantageously, the average temperature of the product and of the gas entering the suction duct 5 is substantially higher than the temperature of the emulsion exiting the delivery duct 7.

Advantageously, the temperature of the emulsion exiting the delivery duct 7 can be controlled either by varying the power of the cooling means 11 or by varying the rotation speed of the double worm screw 9 in order to vary the permanence of the product, gas or emulsion in the pump 3 and therefore the amount of heat exchange with the cooling means 11.

Advantageously, the method also comprises the step of detecting or obtaining the number of rotations carried out by the double worm screw 9.

In this way, for example, starting from the count of the number of revolutions of the motor 32, and knowing the transmission characteristics of the transmission group 34 as well as the geometric characteristics of the double worm screw 9 it is possible to obtain, and therefore control, the quantity of emulsion which is dispensed by the delivery duct 7.

Due to the presence of the double worm screw 9, the pump 3 is a progressive cavity pump and therefore it is a dosing pump able to precisely dose the amount of emulsion to be dispensed.

Advantageously, the pump 3 is a reversible pump. In this way it is possible to suck a liquid from the delivery duct 7 towards the suction duct 5. In this way it is also possible to remove the product residues from the circuits downstream of the device 1, returning them for example to the container upstream of the device 1, which is generally kept under controlled temperature conditions.

Advantageously, the method comprises the step of monitoring the density of the emulsion exiting the delivery duct 7 by measuring the torque necessary to rotate the pump 3, for example measuring the torque absorbed by the motor 32 or by deriving it from the power absorbed by the motor 32. The density of the emulsion is linked to the consistency of the emulsion itself.

In practice it has been established that the device for emulsifying liquid or solid products, in particular food products such as milk or ice cream, according to the present disclosure, as well as the relative method, perform the intended task and objects, since they allow producing cold emulsions of food products in an extremely simple, low-cost and particularly flexible and functional way.

Another advantage of the device and of the method according to the disclosure lies in the fact that it is possible to produce whipped, creamed and cooled ice cream or milk using a single instrument capable of performing all the functions necessary for the process.

In fact the device for emulsifying liquid or solid products is capable of carrying out, in a single compact device, all the functions of: aeration, emulsion, texturing, pumping, cooling, creaming and direct dispensing.

A further advantage of the device and of the method, according to the disclosure, is that it guarantees a high standard of quality of the beverage/food, guaranteed by the particular design of the pump which carries out a progressive and controlled effect of homogenisation and texturing of the whipped and/or creamed and/or cooled ice cream or food.

Another advantage of the device and of the method according to the disclosure lies in the fact that they guarantee a high degree of hygiene thanks to the reduction of all the "dead volumes" inside the device and are able to minimise the quantities of water and liquid detergent needed for the washing and rinsing operations.

A further advantage of the device and of the method according to the disclosure lies in the fact that the food can be obtained automatically and can be selected at different desired temperatures.

Another advantage of the device and of the method according to the disclosure is that it is possible to vary the quantity of food, regardless of whether it is emulsified or whipped or cooled, by intervening on the speed and number of pump rotations.

Another advantage of the device and of the method according to the disclosure is that it is possible to dose the amount of emulsion to be dispensed.

The device and method thus conceived are susceptible to many modifications and variants, all falling within the same inventive concept; furthermore, all details can be replaced by equivalent technical elements. In practice, the materials used, as well as the dimensions, can be of any type according to the technical requirements.

In practice, the materials used, provided they are compatible with the specific use, as well as the dimensions and the contingent shapes, can be any according to the requirements.

The invention claimed is:

1. A device for emulsifying liquid or solid products, in particular food products, comprising:
    a pump comprising at least one suction duct adapted for sucking a product to be emulsified and an emulsifying gas, and
    a delivery duct adapted for dispensing an emulsion obtained from said product to be emulsified and from said emulsifying gas,
    wherein said pump comprises a double worm screw arranged between said suction duct and said delivery duct, said double worm screw being adapted for emulsifying said product and said gas to obtain said emulsion and for pushing at least one of said product, said gas and said emulsion with a flow parallel to an axis of the screws of said double worm screw from said suction duct to said delivery duct, wherein the double worm screw comprises a pair of worm screws having diameters and profiles different from each other; wherein the profiles are conjugated;

wherein said device further comprises cooling means associated with said pump in an area comprised between said suction duct and said delivery duct and adapted for cooling at least one of said product, said gas and said emulsion present in said area of said pump comprised between said suction duct and said delivery duct;

wherein said pump comprises a casing made of a heat-conducting material, said cooling means being embedded in said casing.

2. The device, according to claim 1, comprising two suction ducts to form a pair of suction ducts that are separated and adapted for respectively sucking said product to be emulsified and said emulsifying gas.

3. The device, according to claim 1, wherein said cooling means comprise a plurality of cooling channels, through which a cooling liquid flows, which surround said double worm screw.

4. The device, according to claim 1, wherein said cooling means extend along the entire longitudinal extension of said pump between said suction duct and said delivery duct.

5. The device, according to claim 1, wherein said heat-conducting material comprises one or more materials configured to exploit the accumulation of sensible heat, thermochemical heat or latent heat, said one or more materials configured to exploit the accumulation of sensible heat, thermochemical heat or latent heat being associated with, or at least partially embedded in, said casing.

6. The device, according to claim 1, wherein said double worm screw is made of a heat-conducting material, said cooling means being associated with, or at least partially embedded in, said double worm screw.

7. The device, according to claim 1, further comprising a temperature sensor adapted for detecting the temperature of said emulsion exiting from said delivery duct.

8. The device, according to claim 1, wherein said pump comprises a motor adapted for actuating said double worm screw through a transmission joint, said device comprising a control module configured to set a rotation speed of said motor and therefore of said double worm screw or to count a number of revolutions of said motor and thus obtain the number of revolutions of said double worm screw.

9. The device, according to claim 1, wherein said double worm screw comprises a pair of worm screws with helical profile and antagonist coils set in rotation along mutually parallel axes.

10. The device, according to claim 1, wherein said suction duct comprises mixing means configured to perform at least one of remix, emulsify, and cream, inside said suction duct, said product to be emulsified.

11. The device, according to claim 1, further comprising a single worm screw placed in series with said double worm screw, said cooling means being provided at said single worm screw.

12. The device, according to claim 3, wherein said plurality of cooling channels is housed inside said casing which holds the double worm screw close to a variable-volume chamber defined by antagonist coils of the double worm screw.

13. The device according to claim 1, wherein said suction duct comprises mixing means configured to remix, emulsify or cream, inside said suction duct, said product to be emulsified.

14. A device for emulsifying liquid or solid products, in particular food products, comprising a pump comprising at least one suction duct adapted for sucking a product to be emulsified and an emulsifying gas, and a delivery duct adapted for dispensing an emulsion obtained from said product to be emulsified and from said emulsifying gas, wherein said pump comprises a double worm screw arranged between said suction duct and said delivery duct, said double worm screw being adapted for emulsifying said product and said gas to obtain said emulsion and for pushing at least one of said product, said gas and said emulsion with a flow parallel to an axis of the screws of said double worm screw from said suction duct to said delivery duct, wherein the double worm screw comprises a pair of worm screws having diameters and profiles different from each other;

wherein said device further comprises cooling means associated with said pump in an area comprised between said suction duct and said delivery duct and adapted for cooling at least one of said product, said gas and said emulsion present in said area of said pump comprised between said suction duct and said delivery duct;

wherein said pump comprises a casing made of a heat-conducting material, said cooling means being embedded in said casing;

wherein the cooling means is integrated within said casing so that any point of the entire external surface of the cooling means is in direct contact with the casing.

\* \* \* \* \*